(12) United States Patent
Yoshimoto (10) Patent No.: US 10,757,298 B2
(45) Date of Patent: Aug. 25, 2020

(54) INFORMATION PROCESSING APPARATUS TO WHICH STORAGE DEVICE CORRELATED TO USER IS ATTACHED IN DETACHABLE MANNER

(71) Applicant: KYOCERA Document Solutions Inc., Osaka-shi, Osaka (JP)

(72) Inventor: Yusuke Yoshimoto, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/535,410

(22) Filed: Aug. 8, 2019

(65) Prior Publication Data

US 2020/0068093 A1    Feb. 27, 2020

(30) Foreign Application Priority Data

Aug. 21, 2018 (JP) .................. 2018-154584

(51) Int. Cl.
| | |
|---|---|
| *G06F 15/00* | (2006.01) |
| *G06F 3/12* | (2006.01) |
| *G06K 1/00* | (2006.01) |
| *H04N 1/44* | (2006.01) |
| *H04N 1/32* | (2006.01) |

(52) U.S. Cl.
CPC ....... *H04N 1/4426* (2013.01); *H04N 1/32512* (2013.01); *H04N 1/444* (2013.01); *H04N 1/4433* (2013.01)

(58) Field of Classification Search
CPC ............ H04N 1/4426; H04N 1/32512; H04N 1/4433; H04N 1/444

USPC ....................... 358/1.13, 1.1, 1.14
See application file for complete search history.

(56) References Cited

U.S. PATENT DOCUMENTS

| | | | |
|---|---|---|---|
| 2013/0214157 A1* | 8/2013 | Kitano | ............... A61B 6/4283 250/336.1 |
| 2014/0164435 A1* | 6/2014 | Backa | ............... G06F 21/6218 707/783 |

FOREIGN PATENT DOCUMENTS

JP      2016-111496 A      6/2016

* cited by examiner

*Primary Examiner* — Douglas Q Tran
(74) *Attorney, Agent, or Firm* — Alleman Hall Creasman & Tuttle LLP (57) ABSTRACT

An information processing apparatus includes an attachment portion, a log-in processing portion, a correlation processing portion, and a restriction processing portion. To the attachment portion, a storage device is attached in a detachable manner. The log-in processing portion authorizes a user to log in based on a predetermined authentication operation. The correlation processing portion correlates the storage device attached to the attachment portion with a user who has already logged in when the storage device is attached to the attachment portion, or with a user who first logs in after the storage device is attached to the attachment portion and kept to be attached. The restriction processing portion restricts access to the storage device attached to the attachment portion, to the user who is correlated with the storage device by the correlation processing portion.

10 Claims, 5 Drawing Sheets

INFORMATION PROCESSING APPARATUS TO WHICH STORAGE DEVICE CORRELATED TO USER IS ATTACHED IN DETACHABLE MANNER

INCORPORATION BY REFERENCE

This application is based upon and claims the benefit of priority from the corresponding Japanese Patent Application No. 2018-154584 filed on Aug. 21, 2018, the entire contents of which are incorporated herein by reference.

BACKGROUND

The present disclosure relates to an information processing apparatus and an information processing method.

There is known an information processing apparatus that includes an attachment portion to which a storage device, such as a USB memory, is attached in a detachable manner. In this type of information processing apparatus, a user who has attached a storage device to the attachment portion may forget to detach it and leave the vicinity of the information processing apparatus. In that case, a third person who uses the information processing apparatus next may use data stored in the storage device attached to the attachment portion. On the other hand, there is known an information processing system that saves the data from the storage device when the storage device has been forgotten to be detached from the attachment portion.

SUMMARY

An information processing apparatus according to an aspect of the present disclosure includes an attachment portion, a log-in processing portion, a correlation processing portion, and a restriction processing portion. To the attachment portion, a storage device is attached in a detachable manner. The log-in processing portion authorizes a user to log in based on a predetermined authentication operation. The correlation processing portion correlates the storage device attached to the attachment portion with a user who has already logged in when the storage device is attached to the attachment portion, or with a user who first logs in after the storage device is attached to the attachment portion and kept to be attached. The restriction processing portion restricts access to the storage device attached to the attachment portion, to the user who is correlated with the storage device by the correlation processing portion.

An information processing method according to another aspect of the present disclosure is executed in an information processing apparatus including an attachment portion to which a storage device is attached in a detachable manner. The information processing method includes a log-in step, a correlation step, and a restriction step. The log-in step of authorizes a user to log in based on a predetermined authentication operation. The correlation step correlates a storage device attached to the attachment portion with a user who has already logged in when the storage device is attached to the attachment portion, or with a user who first logs in after the storage device is attached to the attachment portion and kept to be attached. The restriction step restricts access to the storage device attached to the attachment portion, to the user who is correlated with the storage device by the correlation step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 10]

Figure 1:
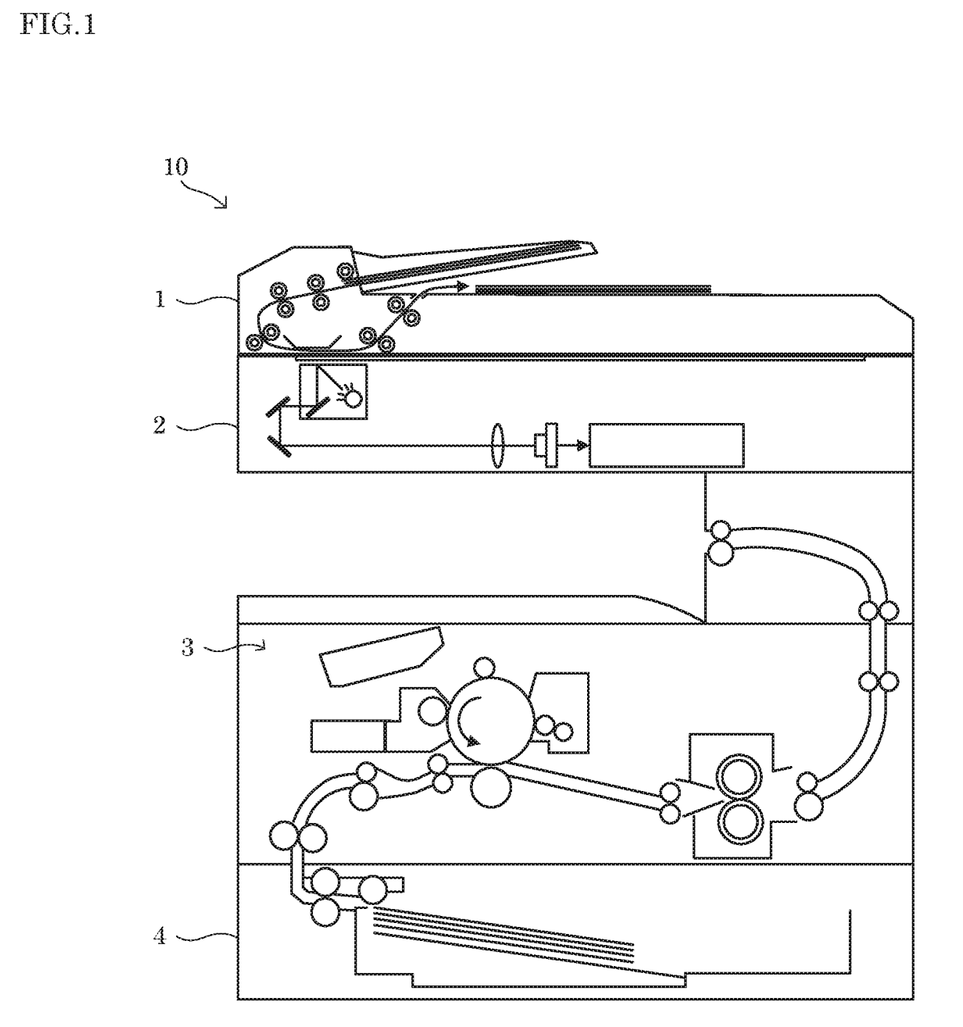
FIG. 1 is a diagram showing a configuration of an image forming apparatus according to an embodiment of the present disclosure.
Figure 2:
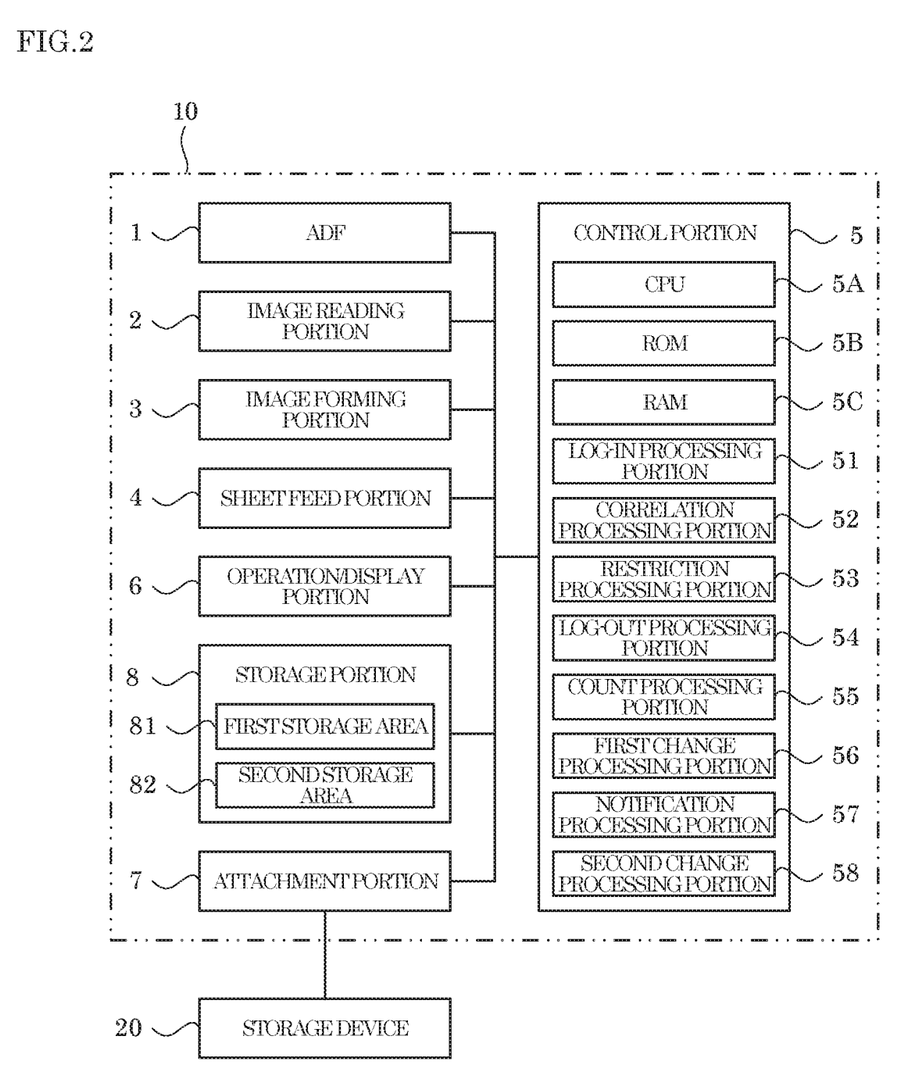
FIG. 2 is a block diagram showing a system configuration of the image forming apparatus according to the embodiment of the present disclosure.

First, a description is given of a configuration of an image forming apparatus 10 according to an embodiment of the present disclosure with reference to FIG. 1 and FIG. 2. Here, FIG. 1 is a schematic cross-section diagram showing the configuration of the image forming apparatus 10.

The image forming apparatus 10 is a multifunction peripheral having a plurality of functions such as a scan function for reading image data from a document sheet, a print function for forming an image based on image data, a facsimile function, and a copy function. Here, the image forming apparatus 10 is an example of an information processing apparatus of the present disclosure. It is noted that the information processing apparatus of the present disclosure may be a scanner, a printer, a facsimile apparatus, a copier, a personal computer, a notebook computer or the like.

As shown in FIG. 1 and FIG. 2, the image forming apparatus 10 includes an ADF (Auto Document Feeder) 1, an image reading portion 2, an image forming portion 3, a sheet feed portion 4, a control portion 5, an operation/display portion 6, an attachment portion 7, and a storage portion 8. It is noted that in FIG. 2, the image forming apparatus 10 is indicated by a two-dot chain line.

The ADF 1 includes a document sheet setting portion, a plurality of conveyance rollers, a document sheet pressing, and a sheet discharge portion, and conveys a document sheet so that it is read by the image reading portion 2.

The image reading portion 2 includes a document sheet table, a light source, a plurality of mirrors, an optical lens, and a CCD, and is configured to read image data from a document sheet.

The image forming portion 3 is configured to form an image on a sheet by an electrophotographic method based on image data read by the image reading portion 2. In addition, the image forming portion 3 is configured to form an image on a sheet based on image data input from an external information processing apparatus. Specifically, the image forming portion 3 includes a photoconductor drum, a charging device, a laser scanning unit (LSU), a developing device, a transfer roller, a cleaning device, a fixing roller, a pressure roller, and a sheet discharge tray. It is noted that the image forming portion 3 may form an image by another image forming method such as an inkjet method.

The sheet feed portion 4 includes a sheet feed cassette and a plurality of conveyance rollers, and supplies sheets one by one to the image forming portion 3. The image forming portion 3 forms an image on a sheet supplied from the sheet feed portion 4, based on the image data. The sheet with the image formed thereon is discharged to the sheet tray.

The control portion 5 includes control equipment such as a CPU 5A, a ROM 5B, and a RAM 5C. The CPU 5A is a processor that executes various calculation processes. The ROM 5B is a nonvolatile storage device in which various information such as control programs for causing the CPU 5A to execute various processes are preliminarily stored. The RAM 5C is a volatile storage device that is used as a temporary storage memory (working area) for the various processes executed by the CPU. In the control portion 5, the CPU 5A executes the various control programs stored in advance in the ROM 5B. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion. The display portion is, for example, a liquid crystal display and displays various types of information in response to control instructions from the control portion 5. The operation portion is composed of, for example, operation keys or a touch panel through which various types of information are input to the control portion 5 in response to user operations.

The attachment portion 7 includes a USB connection terminal to which an external electronic device is attached in a detachable manner so that data input/output between the electronic device and the image forming apparatus 10 can be performed in accordance with the USB standard. For example, a storage device 20 (see FIG. 2) is attached to the attachment portion 7 in a detachable manner so that data reading/writing between the storage device 20 and the image forming apparatus 10 can be performed in accordance with the USB standard. For example, the storage device 20 is a USB memory.

The storage portion 8 is a nonvolatile storage device. For example, the storage portion 8 is a storage device such as a nonvolatile memory, a SSD (Solid State Drive), or a HDD (Hard Disk Drive), wherein the nonvolatile memory is, for example, a flash memory or an EEPROM.

As shown in FIG. 2, the storage portion 8 includes a first storage area 81 and a second storage area 82.

The first storage area 81 stores authentication information for each of users who are registered to log in the image forming apparatus 10. The authentication information is used during authentication of a user by the image forming apparatus 10. For example, the authentication information includes a user name and a password.

The second storage area 82 stores correspondence information indicating correspondence between the users who are registered to log in the image forming apparatus 10 and storage devices 20 that were once attached to the attachment portion 7. Here, the second storage area 82 is an example of a storage portion of the present disclosure.

Meanwhile, in the image forming apparatus 10, a user who has attached a storage device 20 to the attachment portion 7 may forget to detach it and leave the vicinity of the image forming apparatus 10. In that case, a third person who uses the image forming apparatus 10 next may use data stored in the storage device 20 attached to the attachment portion 7. On the other hand, there is known an information processing system that saves the data from the storage device 20 when the storage device 20 has been forgotten to be detached from the attachment portion 7.

However, to save the data from the storage device 20 forgotten to be detached, the image forming apparatus 10 needs to assign a storage area for storing the saved data. On the other hand, as described below, the image forming apparatus 10 according to the embodiment of the present disclosure is configured to restrict a third person from using data stored in the storage device 20 forgotten to be detached, without saving the data.

Specifically, the ROM 5B of the control portion 5 preliminarily stores a correlation program for causing the CPU 5A of the control portion 5 to execute a correlation process (see the flowchart of FIG. 3) that is described below. It is noted that the correlation program may be recorded on a non-transitory computer-readable recording medium such as a CD, a DVD, or a flash memory, and may be read from the recording medium and installed in the storage portion 8.

As shown in FIG. 2, the control portion 5 includes a log-in processing portion 51, a correlation processing portion 52, a restriction processing portion 53, a log-out processing portion 54, a count processing portion 55, a first change processing portion 56, a notification processing portion 57, and a second change processing portion 58. Specifically, the control portion 5 executes the correlation program stored in the ROM 5B by using the CPU 5A. This allows the control portion 5 to function as the log-in processing portion 51, the correlation processing portion 52, the restriction processing portion 53, the log-out processing portion 54, the count processing portion 55, the first change processing portion 56, the notification processing portion 57, and the second change processing portion 58.

The log-in processing portion 51 executes a log-in process to authorize a user to log in based on a predetermined authentication operation.

For example, as necessary, the log-in processing portion 51 displays, on the operation/display portion 6, an authentication screen on which the authentication operation is performed. The log-in processing portion 51 receives the authentication operation that is performed on the authentication screen by the user. For example, the authentication operation is to input log-in information such as a user name and a password. Subsequently, when the log-in information input through the operation/display portion 6 matches any one of one or more pieces of authentication information stored in the first storage area 81, the log-in processing portion 51 determines that the authentication is successful, and permits the user to log in the image forming apparatus 10.

The correlation processing portion 52 correlates a storage device 20 attached to the attachment portion 7 with a user who has already logged in when the storage device 20 is attached to the attachment portion 7, or with a user who first logs in after the storage device 20 is attached to the attachment portion 7 and kept to be attached.

For example, the correlation processing portion 52 correlates a storage device 20 attached to the attachment portion 7 with a user by storing, in the second storage area 82, a piece of correspondence information that indicates correspondence between the storage device 20 and a user who had already logged in when the storage device 20 was attached to the attachment portion 7, or correspondence between the storage device 20 and a user who first logged in after the storage device 20 had been attached to the attachment portion 7 and kept to be attached.

Specifically, when a storage device 20 is attached to the attachment portion 7, the correlation processing portion 52 determines whether or not a piece of correspondence information corresponding to the storage device 20 is stored in the second storage area 82. Here, upon determining that a piece of correspondence information corresponding to the storage device 20 attached to the attachment portion 7 is stored in the second storage area 82, the correlation processing portion 52 does not execute the correlation process of correlating the storage device 20 with a user since the storage device 20 has already been correlated with a user. On the other hand, upon determining that a piece of correspondence information corresponding to the storage device 20 attached to the attachment portion 7 is not stored in the second storage area 82, the correlation processing portion 52 executes the correlation process of correlating the storage device 20 with a user. For example, in a case where a user has already logged in when a storage device 20 is attached to the attachment portion 7, the correlation processing portion 52 stores, in the second storage area 82, a piece of correspondence information indicating correspondence between the storage device 20 attached to the attachment portion 7 and the logged-in user. In addition, in a case where a user has not logged in when a storage device 20 is attached to the attachment portion 7, the correlation processing portion 52 causes the log-in processing portion 51 to execute the log-in process, and stores, in the second storage area 82, a piece of correspondence information indicating correspondence between a user who has logged in during the log-in process and the storage device 20 attached to the attachment portion 7.

The restriction processing portion 53 restricts access to the storage device 20 attached to the attachment portion 7, to the user who is correlated with the storage device 20 by the correlation processing portion 52.

For example, when a user logs in the image forming apparatus 10 in a state where a storage device 20 correlated with a user has been attached to the attachment portion 7 and kept to be attached, the restriction processing portion 53 determines whether or not the logged-in user matches the user correlated with the storage device 20. Upon determining that the logged-in user does not match the user correlated with the storage device 20 attached to the attachment portion 7, the restriction processing portion 53 prohibits the logged-in user from accessing the storage device 20.

In addition, when a storage device 20 correlated with a user is attached to the attachment portion 7 in a state where a user has already logged in the image forming apparatus 10, the restriction processing portion 53 determines whether or not the logged-in user matches the user correlated with the storage device 20. Upon determining that the logged-in user does not match the user correlated with the storage device 20 attached to the attachment portion 7, the restriction processing portion 53 prohibits the logged-in user from accessing the storage device 20.

The log-out processing portion 54, when a user who has logged in the image forming apparatus 10 satisfies any of predetermined log-out conditions, executes a log-out process to log out the logged-in user.

For example, the log-out conditions include that a no-operation state of the image forming apparatus 10 has continued for more than a predetermined set time period, and that the user has input an instruction to execute the log-out process by operating the operation/display portion 6. For example, the set time period is 10 minutes. It is noted that the set time period may be arbitrarily determined. In addition, the log-out conditions may not include that the no-operation state of the image forming apparatus 10 has continued for more than the set time period.

The count processing portion 55 counts, for each of users who log in, the number of detachment failures, namely the number of times that a user logged out without detaching a storage device 20 correlated with the user from the attachment portion 7.

For example, in the image forming apparatus 10, frequency information is stored in the first storage area 81 for each of users who are registered to log in the image forming apparatus 10. The frequency information indicates the number of detachment failures for each of users who are registered to log in the image forming apparatus 10 and is stored in association with the authentication information of each of the users.

When a user logs out without detaching a storage device 20 correlated with the user from the attachment portion 7, the count processing portion 55 increments the number of detachment failures indicated in the frequency information of the user.

The first change processing portion 56 shortens the set time period when the logged-in user matches a user who is correlated with the storage device 20 attached to the attachment portion 7.

For example, the larger the number of detachment failures of the logged-in user counted by the count processing portion 55 is, the larger the amount by which the set time period is shortened by the first change processing portion 56 is.

For example, in a case where the number of detachment failures of the logged-in user counted by the count processing portion 55 is 0 (zero), the first change processing portion 56 shortens the set time period by three minutes. In addition, each time the number of detachment failures of the logged-in user is incremented by one by the count processing portion 55, the first change processing portion 56 adds one minute to the amount by which it shortens the set time period, with a predetermined upper-limit value being set as the upper limit of the amount. For example, the upper-limit value is nine minutes.

It is noted that in the image forming apparatus 10, the amount by which the set time period is shortened, may be set for each of the users who are registered to log in the image forming apparatus 10. In that case, the first change processing portion 56 may shorten the set time period by the amount that has been set in advance in correspondence with the logged-in user.

In addition, the first change processing portion 56 may shorten the set time period based on the type of data stored in the storage device 20 attached to the attachment portion 7. For example, in a case where the data stored in the storage device 20 includes first specific data that requires input of a password for its content to be disclosed, the set time period may be shortened by a larger amount than in a case where the data stored in the storage device 20 does not include the first specific data. In addition, in a case where the data stored in the storage device 20 includes second specific data that includes a predetermined keyword such as "confidential", the set time period may be shortened by a larger amount than in a case where the data stored in the storage device 20 does not include the second specific data.

The notification processing portion 57, when the set time period has been shortened by the first change processing portion 56, notifies the fact. For example, the notification processing portion 57 displays, on the operation/display portion 6, a message indicating that the set time period has been shortened.

The second change processing portion 58, in a case where a storage device 20 was detached from the attachment portion 7 after the set time period had been shortened by the first change processing portion 56 and before the logged-in user logged out, returns the shortened set time period to an initial value of the set time period.

It is noted that the control portion 5 may not include one or more of the count processing portion 55, the first change processing portion 56, the notification processing portion 57, and the second change processing portion 58.

[Correlation Process]

Figure 3:
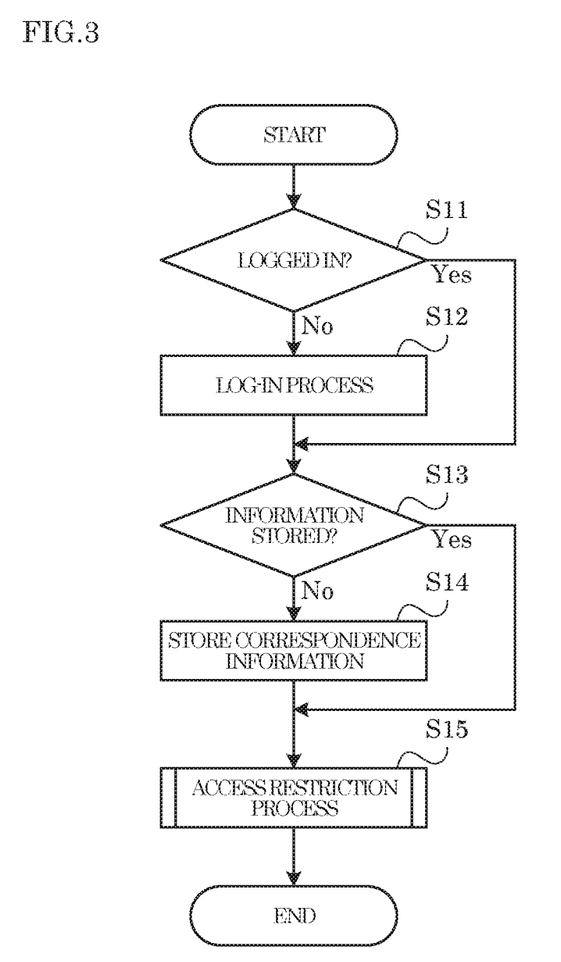
FIG. 3 is a flowchart showing an example of a correlation process executed in the image forming apparatus according to the embodiment of the present disclosure.

In the following, with reference to FIG. 3, a description is given of an example of the procedure of the correlation process executed by the control portion 5 in the image forming apparatus 10, and a part of the information processing method of the present disclosure. Here, steps S11, S12, . . . represent numbers assigned to the processing procedures (steps) executed by the control portion 5. It is noted that when a storage device 20 is attached to the attachment portion 7, the correlation process is executed.

<Step S11>

First, in step S11, the control portion 5 determines whether or not a user has logged in.

Upon determining that a user has logged in (Yes side at S11), the control portion 5 moves the process to step S13. In addition, upon determining that a user has not logged in (No side at S11), the control portion 5 moves the process to step S12.

<Step S12>

In step S12, the control portion 5 executes the log-in process. Here, the process of step S12 is an example of a log-in step of the present disclosure, and is executed by the log-in processing portion 51 of the control portion 5.

<Step S13>

In step S13, the control portion 5 determines whether or not a piece of correspondence information corresponding to the storage device 20 attached to the attachment portion 7 is stored in the second storage area 82.

Here, upon determining that a piece of correspondence information corresponding to the storage device 20 attached to the attachment portion 7 is stored in the second storage area 82 (Yes side at S13), the control portion 5 moves the process to step S15. In addition, upon determining that a piece of correspondence information corresponding to the storage device 20 attached to the attachment portion 7 is not stored in the second storage area 82 (No side at S13), the control portion 5 moves the process to step S14.

<Step S14>

In step S14, the control portion 5 stores, in the second storage area 82, a piece of correspondence information showing correspondence between the logged-in user and the storage device 20 attached to the attachment portion 7. Here, the process of step S14 is an example of a correlation step of the present disclosure, and is executed by the correlation processing portion 52 of the control portion 5.

<Step S15>

In step S15, the control portion 5 executes an access restriction process as described in the following.

[Access Restriction Process]

Figure 4:
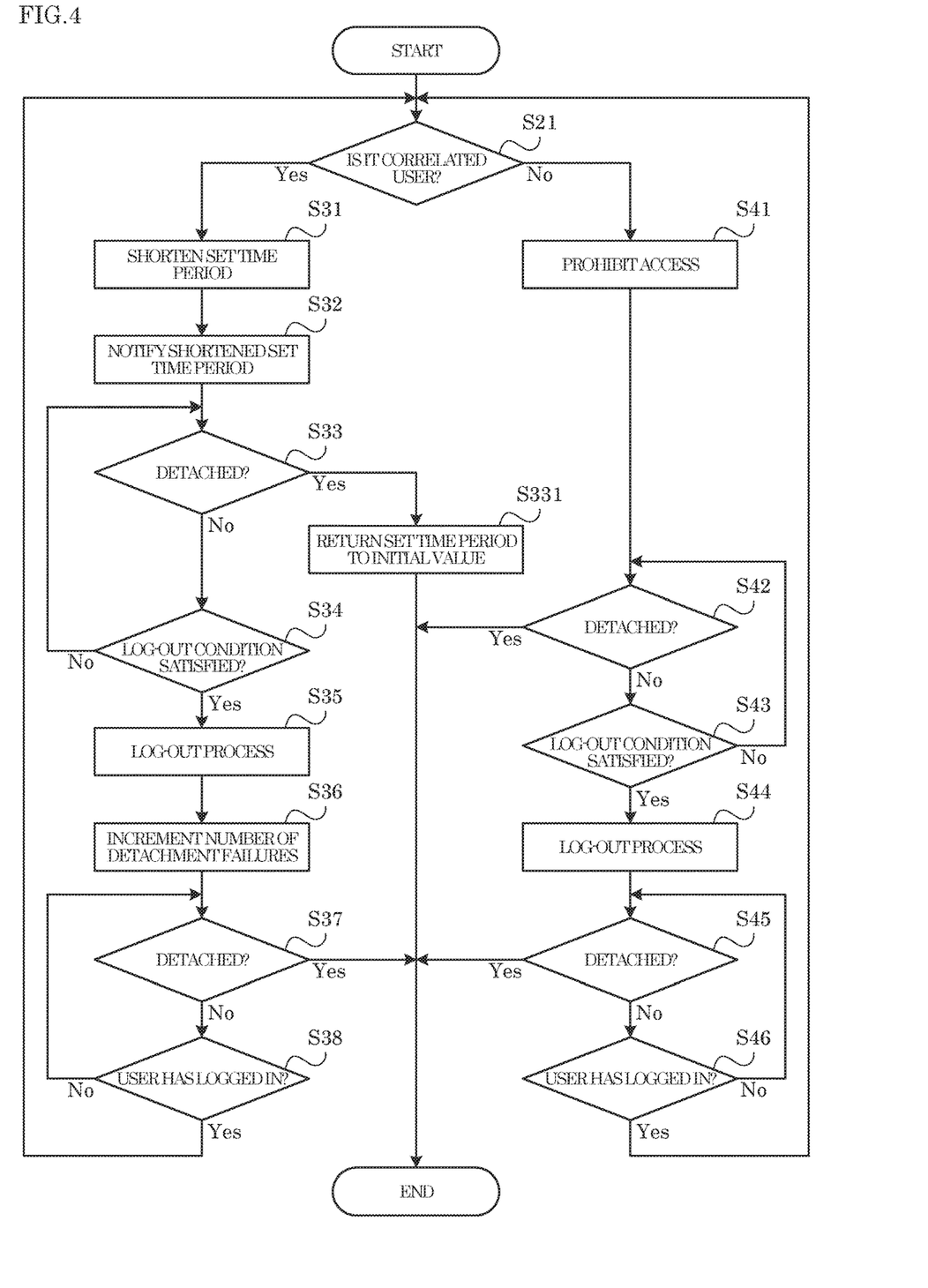
FIG. 4 is a flowchart showing an example of an access restriction process executed in the image forming apparatus according to the embodiment of the present disclosure.

In the following, with reference to FIG. 4, a description is given of an example of the procedure of the access restriction process executed in step S15 of the correlation process, together with a description of the remaining part of the information processing method of the present disclosure.

<Step S21>

First, in step S21, the control portion 5 determines whether or not the logged-in user is a user correlated with the storage device 20 attached to the attachment portion 7.

Here, upon determining that the logged-in user is the user correlated with the storage device 20 attached to the attachment portion 7 (Yes side at S21), the control portion 5 moves the process to step S31. In addition, upon determining that the logged-in user is not the user correlated with the storage device 20 attached to the attachment portion 7 (No side at S21), the control portion 5 moves the process to step S41.

<Step S31>

In step S31, the control portion 5 shortens the set time period. Here, the process of step S31 is executed by the first change processing portion 56 of the control portion 5.

For example, the larger the number of detachment failures of the logged-in user is, the larger the amount by which the set time period is shortened by the control portion 5 is.

<Step S32>

In step S32, the control portion 5 notifies the shortening of the set time period that was performed in step S31. Here, the process of step S32 is executed by the notification processing portion 57 of the control portion 5.

<Step S33>

In step S33, the control portion 5 determines whether or not the storage device 20 has been detached from the attachment portion 7.

Here, upon determining that the storage device 20 has been detached from the attachment portion 7 (Yes side at S33), the control portion 5 moves the process to step S331. In addition, upon determining that the storage device 20 has not been detached from the attachment portion 7 (No side at S33), the control portion 5 moves the process to step S34.

<Step S331>

In step S331, the control portion 5 returns the set time period shortened in step S31 to an initial value of the set time period. Here, the process of step S331 is executed by the second change processing portion 58 of the control portion 5.

<Step S34>

In step S34, the control portion 5 determines whether or not any of the log-out conditions is satisfied.

Here, upon determining that any of the log-out conditions is satisfied (Yes side at S34), the control portion 5 moves the process to step S35. In addition, upon determining that none of the log-out conditions is satisfied (No side at S34), the control portion 5 moves the process to step S33.

<Step S35>

In step S35, the control portion 5 executes the log-out process. Here, the process of step S35 is executed by the log-out processing portion 54 of the control portion 5.

<Step S36>

In step S36, the control portion 5 increments the value of the frequency information corresponding to the user who logged out in step S35. Here, the process of step S36 is executed by the count processing portion 55 of the control portion 5.

It is noted that the control portion 5 may increment the value of the frequency information corresponding to the user who logged out, only when the storage device 20 has not been detached from the attachment portion 7 even after a predetermined time period elapsed from an execution of the process of step S35. That is, if the storage device 20 is detached from the attachment portion 7 before the time period elapses, the control portion 5 may determine that the storage device 20 was not forgotten to be detached from the attachment portion 7.

<Step S37>

In step S37, the control portion 5 determines whether or not the storage device 20 has been detached from the attachment portion 7.

Here, upon determining that the storage device 20 has been detached from the attachment portion 7 (Yes side at S37), the control portion 5 ends the access restriction process. In addition, upon determining that the storage device 20 has not been detached from the attachment portion 7 (No side at S37), the control portion 5 moves the process to step S38.

<Step S38>

In step S38, the control portion 5 determines whether or not a user has logged in the image forming apparatus 10.

Here, upon determining that a user has logged in the image forming apparatus 10 (Yes side at S38), the control portion 5 moves the process to step S21. In addition, upon determining that a user has not logged in the image forming apparatus 10 (No side at S38), the control portion 5 moves the process to step S37.

<Step S41>

When it is determined in step S21 that the logged-in user is not the user correlated with the storage device 20 attached to the attachment portion 7, the process of step S41 is executed. In step S41, the control portion 5 prohibits the logged-in user from accessing the storage device 20 attached to the attachment portion 7. Here, the processes of steps S21 and S41 are an example of a restriction step of the present disclosure, and are executed by the restriction processing portion 53 of the control portion 5.

<Step S42>

In step S42, the control portion 5 determines whether or not the storage device 20 has been detached from the attachment portion 7.

Here, upon determining that the storage device 20 has been detached from the attachment portion 7 (Yes side at S42), the control portion 5 ends the access restriction process. In addition, upon determining that the storage device 20 has not been detached from the attachment portion 7 (No side at S42), the control portion 5 moves the process to step S43.

<Step S43>

In step S43, the control portion 5 determines whether or not any of the log-out conditions is satisfied.

Here, upon determining that any of the log-out conditions is satisfied (Yes at S43), the control portion 5 moves the process to step S44. In addition, upon determining that none of the log-out conditions is satisfied (No at S43), the control portion 5 moves the process to step S42.

<Step S44>

In step S44, the control portion 5 executes the log-out process. Here, the process of step S44 is executed by the log-out processing portion 54 of the control portion 5.

<Step S45>

In step S45, the control portion 5 determines whether or not the storage device 20 has been detached from the attachment portion 7.

Here, upon determining that the storage device 20 has been detached from the attachment portion 7 (Yes side at S45), the control portion 5 ends the access restriction process. In addition, upon determining that the storage device 20 has not been detached from the attachment portion 7 (No side at S45), the control portion 5 moves the process to step S46.

<Step S46>

In step S46, the control portion 5 determines whether or not a user has logged in the image forming apparatus 10.

Upon determining that a user has logged in the image forming apparatus 10 (Yes side at S46), the control portion 5 moves the process to step S21. In addition, upon determining that a user has not logged in (No side at S46), the control portion 5 moves the process to step S45.

As described above, in the image forming apparatus 10, a user who has already logged in when a storage device 20 is attached to the attachment portion 7, or a user who first logs in after a storage device 20 is attached to the attachment portion 7 and kept to be attached, is correlated with the storage device 20. In addition, access to the storage device 20 is restricted to the user correlated with the storage device 20. As a result, when a user who has attached a storage device 20 to the attachment portion 7 forgets to detach it and leaves the vicinity of the image forming apparatus 10, it is possible to restrict data stored in the storage device 20 from being used by a third person.

In addition, the image forming apparatus 10 executes the log-out process to log out the logged-in user when the no-operation state has continued for more than the set time period. In addition, the set time period is shortened when the logged-in user matches a user who is correlated with a storage device 20 attached to the attachment portion 7. As a result, when a user who has attached a storage device 20 to the attachment portion 7 forgets to detach it and leaves the vicinity of the image forming apparatus 10, it is possible to restrict data stored in the storage device 20 from being used by a third person by using the log-in state of the user.

[Modifications]

User information may be stored in the second storage area 82 in place of the correspondence information, wherein the user information indicates a user who is correlated with a storage device 20 attached to the attachment portion 7.

In that case, the correlation processing portion 52 may correlate a storage device 20 attached to the attachment portion 7 with a user by updating the user information stored in the second storage area 82 each time a storage device 20 is attached to the attachment portion 7.

Figure 5:
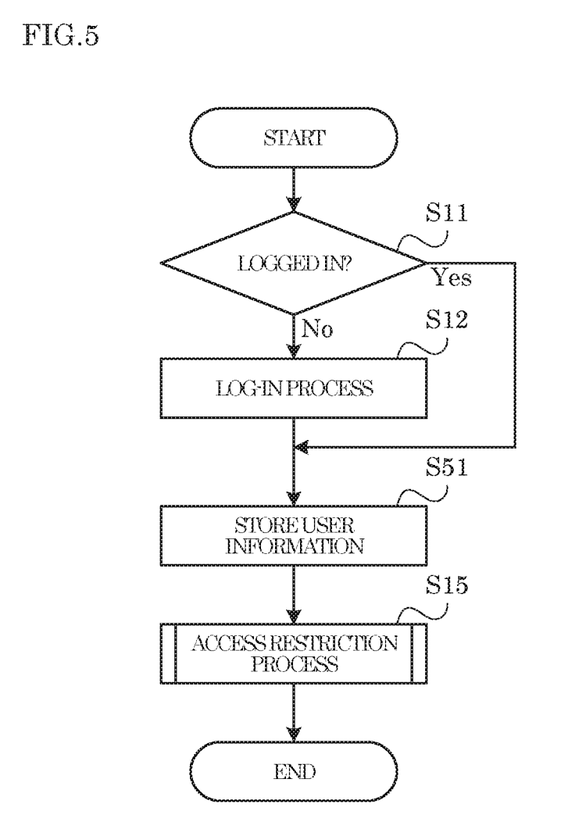
FIG. 5 is a flowchart showing another example of the correlation process executed in the image forming apparatus according to the embodiment of the present disclosure.

In addition, the correlation process may be modified as shown in FIG. 5. In the correlation process shown in FIG. 5, compared with the correlation process shown in FIG. 3, the process of step S13 has been omitted, and the process of step S51 is executed in place of the process of step S14. In step S51, the control portion 5 updates the user information stored in the second storage area 82, and the user indicated by the user information is changed to the logged-in user. In the correlation process shown in FIG. 5, compared with the correlation process shown in FIG. 3, the correspondence information for each user does not need to be stored in the second storage area 82. As a result, it is possible to reduce the storage capacity of the second storage area 82.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
   an attachment portion to which a storage device is attached in a detachable manner;
   a log-in processing portion configured to authorize a user to log in based on a predetermined authentication operation;
   a correlation processing portion configured to correlate the storage device attached to the attachment portion with a user who has already logged in when the storage device is attached to the attachment portion, or with a user who first logs in after the storage device is attached to the attachment portion and kept to be attached; and
   a restriction processing portion configured to restrict access to the storage device attached to the attachment portion, to the user who is correlated with the storage device by the correlation processing portion.

2. The information processing apparatus according to claim 1, further comprising:
   a storage portion configured to store correspondence information indicating correspondence between one or more storage devices that were once attached to the attachment portion and one or more users, wherein
   in a case where a storage device has been attached to the attachment portion and no piece of correspondence information corresponding to the storage device is stored in the storage portion, the correlation processing portion stores, in the storage portion, a piece of correspondence information indicating correspondence between the storage device and a user who had already logged in when the storage device was attached to the attachment portion, or correspondence between the storage device and a user who first logged in after the storage device had been attached to the attachment portion and kept to be attached.

3. The information processing apparatus according to claim 1, further comprising:
   a storage portion configured to store user information indicating a user who is correlated with a storage device attached to the attachment portion, wherein
   the correlation processing portion updates the user information stored in the storage portion each time a storage device is attached to the attachment portion.

4. The information processing apparatus according to claim 1, further comprising:
   a log-out processing portion configured to log out a user when a no-operation state of the information processing apparatus has continued for more than a predetermined set time period; and
   a first change processing portion configured to shorten the set time period when a logged-in user matches a user who is correlated with the storage device attached to the attachment portion.

5. The information processing apparatus according to claim 4, wherein
   the first change processing portion shortens the set time period by an amount that has been set in advance in correspondence with the logged-in user.

6. The information processing apparatus according to claim 4, further comprising:
   a count processing portion configured to count, for each user, the number of detachment failures that is the number of times that a user logged out without detaching a storage device correlated with the user from the attachment portion, wherein
   the larger the number of detachment failures of the logged-in user counted by the count processing portion is, the larger an amount by which the set time period is shortened by the first change processing portion is.

7. The information processing apparatus according to claim 4, wherein
   the first change processing portion shortens the set time period based on a type of data stored in the storage device attached to the attachment portion.

8. The information processing apparatus according to claim 4, further comprising:
   a notification processing portion configured to, when the set time period has been shortened by the first change processing portion, notifies a fact thereof.

9. The information processing apparatus according to claim 4, wherein
   a second change processing portion configured to, in a case where a storage device was detached from the attachment portion after the set time period had been shortened by the first change processing portion and before the logged-in user logged out, returns a shortened set time period to an initial value of the set time period.

10. An information processing method executed in an information processing apparatus including an attachment portion to which a storage device is attached in a detachable manner, the information processing method comprising:
    a log-in step of authorizing a user to log in based on a predetermined authentication operation;
    a correlation step of correlating a storage device attached to the attachment portion with a user who has already logged in when the storage device is attached to the attachment portion, or with a user who first logs in after the storage device is attached to the attachment portion and kept to be attached; and
    a restriction step of restricting access to the storage device attached to the attachment portion, to the user who is correlated with the storage device by the correlation step.

* * * * *